C. SWANSON.
LAWN MOWER ATTACHMENT.
APPLICATION FILED FEB. 20, 1914.
1,135,071.
Patented Apr. 13, 1915.
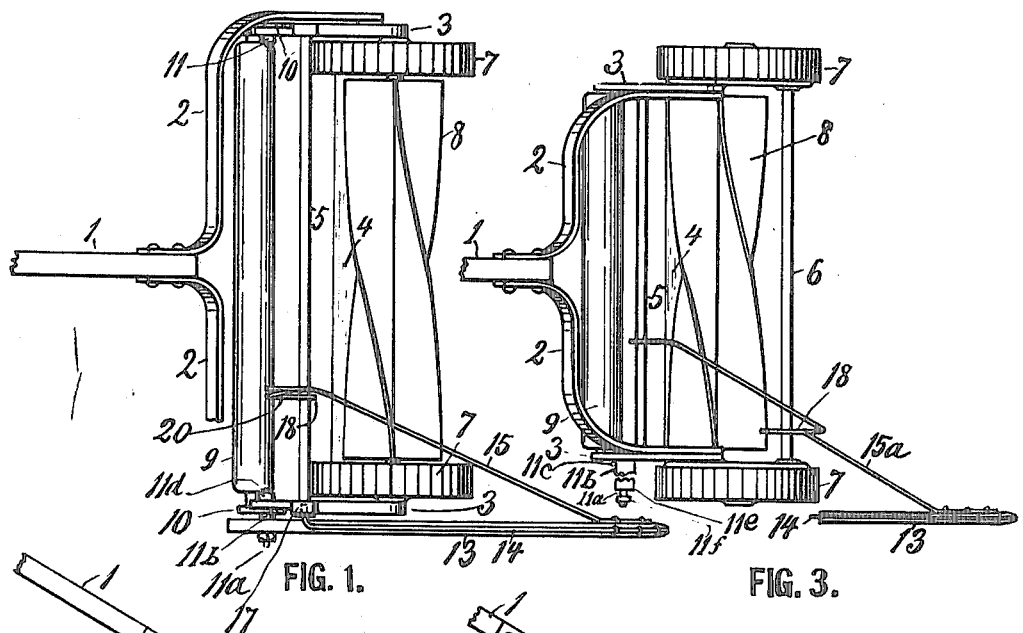
FIG. 1.   FIG. 3.
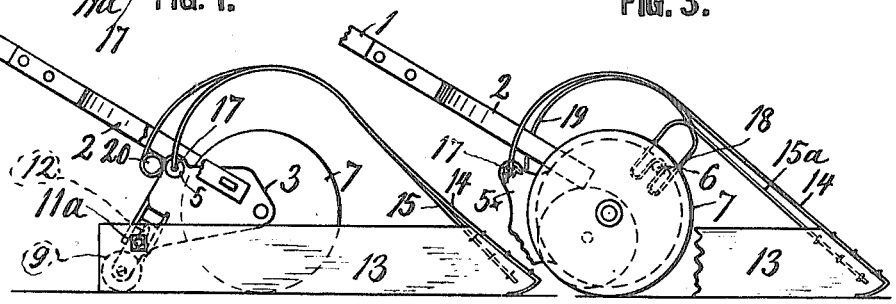
FIG. 2.   FIG. 4.
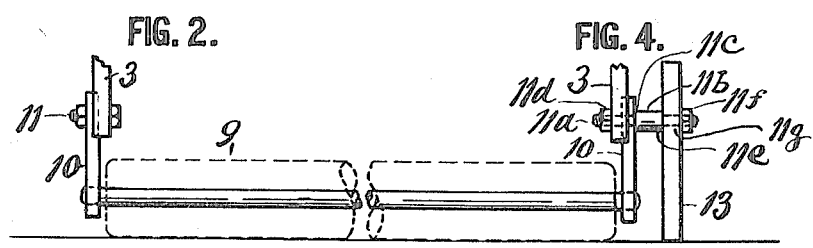
FIG. 5.
FIG. 6.   FIG. 7.
WITNESSES:
D. E. Carlsen.
A. E. Carlsen.
INVENTOR:
Charles Swanson,
BY his ATTORNEY:
A. M. Curlsen.

UNITED STATES PATENT OFFICE.

CHARLES SWANSON, OF SAN JOSE, CALIFORNIA.

LAWN-MOWER ATTACHMENT.

1,135,071.    Specification of Letters Patent.    Patented Apr. 13, 1915.

Application filed February 20, 1914. Serial No. 820,062.

*To all whom it may concern:*

Be it known that I, CHARLES SWANSON, a subject of the King of Sweden, who have declared my intention to become a citizen of the United States, residing at San Jose, in the county of Santa Clara and State of California, have invented a new and useful Lawn-Mower Attachment, of which the following is a specification.

My invention relates to attachments for lawn-mowers, and the object is to provide a lawn-mower with a detachable guard the service of which is to enable the lawn-mower to cut grass close by flowers and hedges without damaging them even if they overhang and partly rest upon the grass to be cut.

In the accompanying drawing, Figure 1 is a top view of a lawn-mower with my attachment mounted on it; a portion of the forked part of the handle being broken away to more fully expose the parts below it. Fig. 2 is a side elevation of Fig. 1. Fig. 3 is a top view of a lawn-mower of a different make or construction than the one shown in Fig. 1, with my attachment slightly modified so as to make it applicable on such varied form of lawn-mower. Fig. 4 is a side elevation of Fig. 3 with the broken away portion of the guard bar 14 restored. Fig. 5 is a rear elevation of either form of the machine with many parts omitted and the ground roller in dotted outline only. Fig. 6 is a detail top view of the rear portion of one of the guard wires or arms. Fig. 7 is mainly a side view of the rear end of the other guard wire.

Referring to the drawing by reference numerals, 1 designates the handle bar having its forked end or arms 2 attached in any suitable manner to the side pieces 3 of the mower frame, which is composed of said side pieces and the usual bar 4 holding the stationary cutter blade (not shown) and a round frame bar 5. Some lawn-mowers have the round frame bar near the front of the machine as the bar 6 in Figs. 3 and 4, others have the two bars 5 and 6.

7 are the ground wheels suitably geared to the rotating cutting roller 8.

9 is the usual wooden supporting roller across the rear of the machine.

In Figs. 1, 2 and 5 the roller 9 has its ends journaled in bearing blocks 10, which are adjustable up and down on the frame by being secured thereto by bolts 11 passed through slots 12 in the bearings (see 12 in Fig. 2).

The guarding attachment is composed of a runner 13 formed of a board arranged to stand edgewise upon the ground and having the top of its front end beveled downward almost to the ground and provided with two upwardly and rearwardly slanting guard bars 14 and 15. The runner 13, has its rear end provided with a hole adapted to receive the bolt 11 of one side of the machine and have the nut of said bolt adjusted against the outer side of the runner. If the machine is so constructed that this will bring the runner too close to the side of the frame 3, or to the wheel 7, where the latter is outside the frame as in Figs. 3 and 4, the bolt 11 is removed and a stud $11^a$ substituted. Said stud, it will be seen, has a thick middle portion $11^b$, forming at one end a shoulder $11^c$ which acts as a bolt head against the bearing block 10 when the nut $11^d$ is tightened; and the shoulder $11^e$ holds the runner in the desired outward position while a nut $11^f$ retains the runner in said position, the nut being tight on the stud or against a shoulder $11^g$ thereof, leaves the runner in a pivoted position so it may swing slightly up and down in passing over uneven parts of ground.

In lawn-mowers having the bar 5, the guard wire or arm 14 has its rear end 17 bent horizontally as shown in Fig. 6 and sprung into a central cavity in the end of the bar 5. The other guard arm 15 has its rear end formed with a hook 18 (see Fig. 7) resting upon the bar 5.

In Figs. 3 and 4 is shown how the guard $15^a$ may have a fork-shaped loop 18 straddling the front bar 6. The rear end of said guard $15^a$ may also then rest on the bar 5 if the latter bar is present, if not present, the guard may terminate as at 19 in Fig. 4, it being held by its front end and partly supported by the bar 6. Where the said bar 5 is absent, the end 17 of the guard 14 may be inserted in a special hole drilled for that purpose in the side piece $5^x$ of the frame, or if the guard is made heavy enough its rear end may remain unsupported.

The loop 20 in Figs. 1 and 7 is to avoid sharp bending of the wire in forming the hook 18; it is also handy for hanging the attachment on a peg during the seasons when there is no use for it.

In the operation of the lawn-mower in cutting grass near by hedges, flower beds and the like, the side of the machine having the guard is caused to pass close by the flowers, and in so doing it partly presses sidwise and partly raises the flowers and guards them from being either rolled down or cut by the machine.

In similar manner the guard acts on leaning or hanging twigs and branches of lilacs, snow-ball bushes and the like on the lawn.

What I claim is:

1. A lawn mower attachment extending in advance of the lawn mower and comprising a runner, means for pivotally attaching its rear portion to the side of the lawn mower frame, so the front end of the runner may vibrate up and down, an inclined arched guard bar secured with its front end to the front end of the runner and means for securing its rear end to the mower frame above the runner.

2. A lawn mower attachment extending in advance of the lawn mower and comprising a runner, means for pivotally attaching its rear portion to the side of a lawn mower frame, so the front end of the runner may vibrate up and down, an inclined arched guard bar secured with its front end to the front end of the runner and means for securing its rear end to the mower frame above the runner, and a second inclined arched guard bar having its front end secured to the front end of the runner and extending diagonally toward the middle of the mower frame, and means carried by said second bar for engaging the mower frame in a vertically yieldable manner.

In testimony whereof I affix my signature, in presence of two witnesses.

CHARLES SWANSON.

Witnesses:
N. E. WRETMAN,
EMMA L. WRETMAN.